United States Patent
Huester et al.

(10) Patent No.: US 12,090,926 B2
(45) Date of Patent: Sep. 17, 2024

(54) METHOD FOR DETECTING WHETHER A MOTOR VEHICLE IS LOCATED WITHIN A SECTION OF A ROADWAY

(71) Applicant: HELLA GmbH & Co. KGaA, Lippstadt (DE)

(72) Inventors: Christian Huester, Salzkotten (DE); Boris Kubitza, Moehnesee-Koerbecke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 78 days.

(21) Appl. No.: 17/902,061

(22) Filed: Sep. 2, 2022

(65) Prior Publication Data
US 2022/0410800 A1    Dec. 29, 2022

Related U.S. Application Data

(63) Continuation of application No. PCT/EP2021/054552, filed on Feb. 24, 2021.

(30) Foreign Application Priority Data

Mar. 5, 2020   (DE) ............... 10 2020 105 876.4

(51) Int. Cl.
   *G08G 1/16*      (2006.01)
   *B60Q 1/04*      (2006.01)
   (Continued)

(52) U.S. Cl.
   CPC ............ *B60Q 9/008* (2013.01); *B60Q 1/04* (2013.01); *B60Q 1/525* (2013.01); *B60Q 9/00* (2013.01);
   (Continued)

(58) Field of Classification Search
   USPC .............. 340/435, 427, 429, 995.25, 995.13, 340/426.22, 446, 571, 691.6, 825.49,
   (Continued)

(56) References Cited

U.S. PATENT DOCUMENTS 9,208,388 B2 * 12/2015 Zobel ................. G08G 1/167
9,514,372 B2 * 12/2016 Feid .................. B60Q 1/085
(Continued)

FOREIGN PATENT DOCUMENTS

DE    102004048010 A1    4/2006
DE    102004048047 A1    4/2006
(Continued)

OTHER PUBLICATIONS

International Search Report dated May 10, 2021 in corresponding application PCT/EP2021/054552.

*Primary Examiner* — Daniel Previl
(74) *Attorney, Agent, or Firm* — Muncy, Geissler, Olds & Lowe, P.C.

(57) ABSTRACT

A method for detecting whether a motor vehicle is located within a section of a roadway, comprising the following steps: detecting roadway markings of a roadway on which the motor vehicle is located, detecting whether the motor vehicle is located within a section of the roadway, wherein the section is defined by section boundaries, and then outputting a warning if the motor vehicle is not located within the section, wherein the section boundaries are defined depending on a marking distance of the roadway markings from one another.

12 Claims, 1 Drawing Sheet

(51) Int. Cl.
*B60Q 1/50* (2006.01)
*B60Q 9/00* (2006.01)
(52) U.S. Cl.
CPC ......... *G08G 1/167* (2013.01); *B60Q 2400/50* (2013.01)
(58) Field of Classification Search
USPC .................................................... 340/815.45
See application file for complete search history.

(56) References Cited

U.S. PATENT DOCUMENTS

| | | | | |
|---|---|---|---|---|
| 2008/0186154 | A1* | 8/2008 | Haug ................... | B62D 15/029 340/435 |
| 2015/0269844 | A1* | 9/2015 | Arndt ..................... | G08G 1/052 340/435 |
| 2015/0339921 | A1* | 11/2015 | Hainzlmaier ........ | G08G 1/0141 340/905 |
| 2016/0107570 | A1* | 4/2016 | Modarres ............. | B62D 15/029 340/435 |
| 2016/0332559 | A1* | 11/2016 | Funk ...................... | H05B 45/10 |
| 2019/0077304 | A1 | 5/2019 | Nakaschima et al. | |
| 2019/0135278 | A1* | 5/2019 | Hillman ................ | B60W 30/09 |

FOREIGN PATENT DOCUMENTS

| | | |
|---|---|---|
| DE | 102005025387 A1 | 5/2006 |
| DE | 102009001348 A1 | 9/2010 |
| DE | 102012002333 A1 | 8/2013 |
| DE | 102012023054 A1 | 5/2014 |
| DE | 102013002212 A1 | 8/2014 |
| DE | 102013222467 A1 | 5/2015 |
| DE | 102015201767 A1 | 8/2016 |
| DE | 102015115354 A1 | 3/2017 |
| DE | 102017000878 A1 | 11/2017 |
| EP | 3453571 A1 | 3/2019 |
| WO | WO2006108372 A1 | 10/2006 |

* cited by examiner

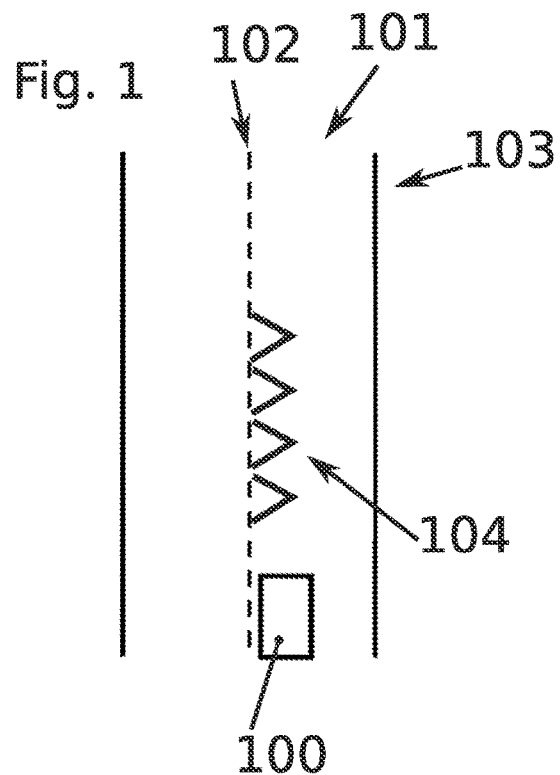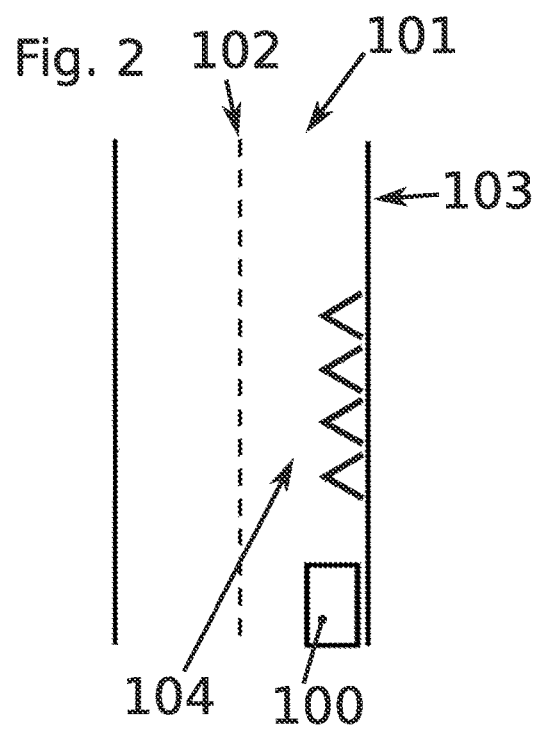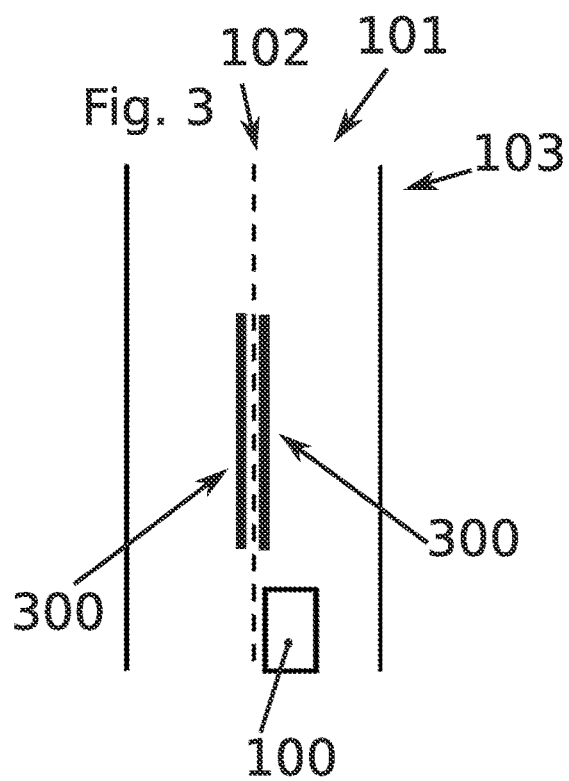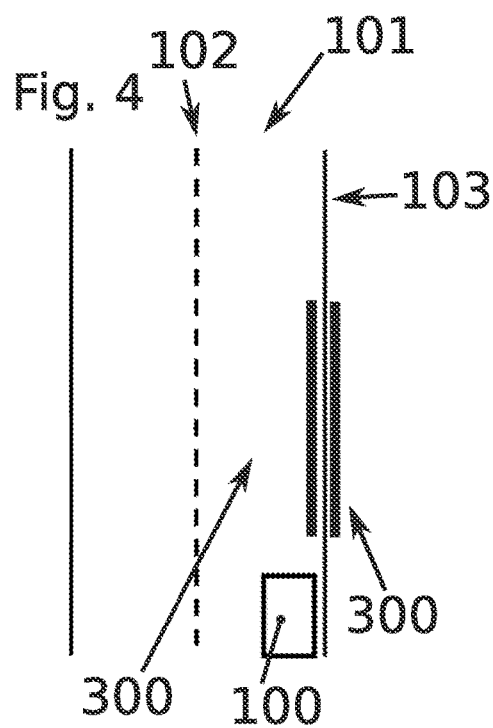

METHOD FOR DETECTING WHETHER A MOTOR VEHICLE IS LOCATED WITHIN A SECTION OF A ROADWAY

This nonprovisional application is a continuation of International Application No. PCT/EP2021/054552, which was filed on Feb. 24, 2021, and which claims priority to German Patent Application No. 10 2020 105 876.4, which was filed in Germany on Mar. 5, 2020, and which are both herein incorporated by reference.

BACKGROUND OF THE INVENTION

Field of the Invention

The present invention relates to a method for detecting whether a motor vehicle is located within a section of a roadway according to the preamble of claim 1.

Description of the Background Art

A method is known from DE 10 2004 048 047 A1, which is incorporated herein by reference for detecting whether a motor vehicle is located within a section of the roadway. The driving behavior of the driver is taken into account in determining the section.

SUMMARY OF THE INVENTION

It is therefore an object of the present invention to define a section that is better adapted to real conditions.

According to an exemplary embodiment, roadway markings of a roadway on which the motor vehicle is located are detected. The roadway markings can be, for example, stripes on a road. It is also detected whether the motor vehicle is located within a section of the roadway as defined by section boundaries. A warning is then output if the motor vehicle is not located within the section. In this way, the driver can be warned that he is relatively close to one of the roadway markings and that there is a risk that he will cross it.

The section boundaries are defined depending on a marking distance of the roadway markings from one another. It can therefore be the case, for example, that the smaller the marking distance, the greater the section's percentage of the roadway. Conversely, the greater the marking distance, the smaller the section's percentage of the roadway. Thus, for example, in the case of a relatively narrow roadway, e.g., within a construction site, the risk of warnings being issued too early can be reduced because the section is only slightly wider than the motor vehicle.

The warning can be projected onto and/or adjacent to the roadway by means of the motor vehicle's headlights. In this case, the warning can comprise symbols, for example, projected into the driver's field of vision. The driver can then perceive the warning without looking away from the roadway. This is possible, for example, with headlights with multiple LEDs as light sources.

The warning can be projected adjacent to one of the roadway markings. This can be, for example, the roadway marking that is closer to the motor vehicle than the other roadway marking, so that the driver can see which of the roadway markings he is too close to. The projection adjacent to the roadway marking is particularly advantageous because it is easier to see there. Often, the roadway markings are bright and are possibly also made particularly highly reflective, so that they have a relatively high brightness when illuminated by the headlights of the motor vehicle. A further increase in brightness is then not as noticeable to the driver as an increase in brightness in a darker area adjacent to the respective roadway marking.

The warning can be formed as lines or arrows. For example, the arrows may have heads pointing away from the roadway marking that is closer to the motor vehicle than the other roadway marking. In this way, the driver is intuitively informed directly in which direction he must steer the motor vehicle in order to prevent driving over the roadway marking. For example, the lines can be arranged parallel to the roadway marking.

The warning can be formed to be dynamic. In particular, this can mean that part of the warning or the entire warning flashes or is animated. This draws the driver's attention to the warning. If only one part of the warning flashes or is animated, the other part can be formed static. It is also possible that the entire warning is formed to be static. Static can mean in particular that the relevant part of the warning or the warning is not flashing and is not animated.

An average marking distance of the roadway markings from one another during a first distance traveled by the motor vehicle can be detected. The section boundaries are then defined depending on the average marking distance. For example, the smaller the average marking distance, the closer the section boundaries can be located to the roadway markings. Conversely, the greater the average marking distance, the farther away the section boundaries can be located from the roadway markings. It is achieved in this way that the risk of warnings being triggered too early is reduced for relatively narrow roadways. For example, the average marking distance can be multiplied by a factor that is less than 1 to calculate the distance of the section boundaries. The factor can, for example, take into account a marking distance customary in the respective country and a distance of the section boundaries from the roadway markings as provided at this customary marking distance.

An average distance of the motor vehicle from the roadway markings during a second distance traveled by the motor vehicle can be detected. In particular, this can mean detecting how far away the motor vehicle is from both roadway markings. In particular, the second distance traveled can be longer than the first distance traveled. The section boundaries can be defined depending on the average distance. In this way, the section boundaries are adapted to the driver's driving behavior. For example, if a driver travels relatively far to the right on the roadway during the second distance traveled, the section will also be positioned relatively far to the right on the roadway. Thus, the probability of unwanted and unnecessary warnings is reduced.

It is also possible for the section boundaries to be defined depending on the average distance and the average marking distance.

The section boundaries can be determined by means of a mathematical formula. Thus, the position of the section boundaries can always be calculated correctly according to the formula.

The section boundaries can be defined by means of a mapping table. In such a mapping table, for example, the distances of the section boundaries from one another can be defined for different marking distances. If necessary, these distances can still be defined depending on the average distance and/or the average marking distance.

The motor vehicle also comprises a detector, a setter, and headlights. The detector is designed to detect roadway markings of a roadway on which the motor vehicle is located. For example, the detector can comprise a camera designed to detect the roadway ahead of the motor vehicle, or other sensors as is known in the conventional art. The detector is also designed to detect whether the motor vehicle is within a section of the roadway. The section is defined by section boundaries. The headlights are designed to output a warning if the motor vehicle is not located within the section. These can be symbols projected onto the roadway by means of the headlights, for example. The setter is designed to set the section boundaries depending on a marking distance of the roadway markings from one another.

The features disclosed in this description for the method can also be present in the case of the motor vehicle or be implemented by the corresponding components of the motor vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a schematic top view of a roadway with a motor vehicle driving thereon and symbols as a warning;

FIG. 2 is a schematic top view of a roadway with a motor vehicle driving thereon and symbols as a warning;

FIG. 3 is a schematic top view of a roadway with a motor vehicle driving thereon and symbols as a warning; and FIG. 4 is a schematic top view of a roadway with a motor vehicle driving thereon and symbols as a warning.

DETAILED DESCRIPTION

A motor vehicle 100 travels on a roadway 101 bounded by roadway markings 102 and 103. Roadway markings 102 and 103 are detected by a detector of motor vehicle 100. For this purpose, the detector can comprise a camera, for example. Depending on a distance of roadway markings 102 and 103 from one another, section boundaries of a section located within roadway 101 are defined by a setter, for example a control unit or ECU of the vehicle, or as is known to one skilled in the art. The section and section boundaries are only present virtually and are used to detect if the motor vehicle is too close to and/or threatening to drive over any of roadway markings 102 and 103.

For example, the section boundaries can be determined depending on the average marking distance of the two roadway markings 102 and 103 from one another during a first distance already traveled by the motor vehicle. If necessary, this average marking distance can be multiplied by a factor less than 1 to determine the distance between the section boundaries. Thus, the section is adapted to the width of roadway 101.

Alternatively or in addition, the distance of one of the section boundaries to the roadway marking 102 could be defined depending on an average distance of the motor vehicle from this roadway marking 102 during a second distance already traveled. If necessary, this average distance can be multiplied by a factor less than 1 to define the distance of this section boundary from roadway marking 102. The other section boundary and its distance from roadway marking 103 can be used in an analogous manner. Thus, the section is adapted to the driving style of the driver of motor vehicle 100.

If motor vehicle 100 is not entirely located within the section, the headlights of the motor vehicle project a warning 104 or 300 onto and/or adjacent to roadway 101. FIG. 1 shows warning 104, which comprises a plurality of arrows as symbols projected onto roadway 101 adjacent to roadway marking 102 to indicate to the driver that motor vehicle 100 is too close to roadway marking 102. In this case, the heads of the arrows point in the direction of the other roadway marking 103.

The same arrows are shown as a warning 104 in FIG. 2. However, in this figure, the motor vehicle is too close to roadway marking 103 so that warning 104 is projected adjacent to roadway marking 103 and the heads of the arrows point in the direction of roadway marking 102.

Warnings 300 are shown in each of FIGS. 3 and 4. Warnings 300 comprise linear symbols, each of which is projected adjacent to roadway marking 102 or 103 that motor vehicle 100 is approaching too closely. The linear symbols extend parallel to roadway markings 102 and 103.

The advantage of projecting warnings 104 and 300 adjacent to roadway markings 102 and 103 is primarily that the symbols are more visible, because this area is typically darker than roadway markings 102 and 103. A further increase in the brightness of roadway markings 102 and 103 is therefore less noticeable to the driver than an increase in brightness in areas adjacent to roadway markings 102 and 103.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting whether a motor vehicle is located within a section of a roadway, the method comprising:
   detecting roadway markings of a roadway on which the motor vehicle is located;
   defining section boundaries of a section of the roadway, the section boundaries being provided between the roadway markings of the roadway;
   detecting whether the motor vehicle is located within the section of the roadway; and
   outputting a warning if the motor vehicle is not located within the section,
   wherein an average marking distance of the roadway markings from one another during a first distance traveled by the motor vehicle is detected, and wherein the section boundaries are defined depending on the average marking distance.

2. The method according to claim 1, wherein the warning is projected onto and/or adjacent to the roadway by at least one headlight of the motor vehicle.

3. The method according to claim 2, wherein the warning is projected adjacent to one of the roadway markings.

4. The method according to claim 1, wherein the warning is formed as lines or arrows.

5. The method according to claim 4, wherein when the warning is formed as lines, the lines extend parallel to and on either side of the roadway marking that is closest to the vehicle, and when the warning is formed as arrows, the arrows are provided adjacent to the roadway marking that is closest to the vehicle and point in a direction towards the roadway marking farther away from the vehicle.

6. The method according to claim 1, wherein the warning is formed to be dynamic.

7. The method according to claim 1, wherein an average distance of the motor vehicle from each of the roadway markings during a second distance traveled by the motor vehicle is detected, where the section boundaries are defined depending on the average distances, respectively.

8. The method according to claim 7, wherein the section boundaries are defined by the average distance multiplied by a factor of less than 1 to determine a distance between the section boundaries and the roadway markings.

9. The method according to claim 1, wherein the section boundaries are determined by a mathematical formula.

10. The method according to claim 1, wherein the section boundaries are defined by a mapping table.

11. The method according to claim 1, wherein the section boundaries are defined by the average marking distance multiplied by a factor of less than 1 to determine a distance between the section boundaries.

12. A motor vehicle comprising:
a detector;
a setter; and
at least one headlight,
wherein the detector detects roadway markings of a roadway on which the motor vehicle is located,
wherein the setter sets section boundaries of a section of the roadway, the section boundaries being provided between the roadway markings of the roadway,
wherein the detector detects whether the motor vehicle is located within the section of the roadway,
wherein the at least one headlight outputs a warning if the motor vehicle is not located within the section, and
wherein an average marking distance of the roadway markings from one another during a first distance traveled by the motor vehicle is detected, and wherein the section boundaries are defined depending on the average marking distance.

* * * * *